H. E. BLANCHARD.

BROACHING MACHINE.

APPLICATION FILED AUG. 14, 1922.

Reissued Oct. 10, 1922.

15,464.

2 SHEETS—SHEET 1.

Inventor

Harry E. Blanchard

By Southgate & Southgate

Attorney

H. E. BLANCHARD.

BROACHING MACHINE.

APPLICATION FILED AUG. 14, 1922.

Reissued Oct. 10, 1922.

15,464.

2 SHEETS—SHEET 2.

Inventor

Harry E. Blanchard

By Southgate & Southgate

Attorney

Reissued Oct. 10, 1922.

Re. 15,464

UNITED STATES PATENT OFFICE.

HARRY E. BLANCHARD, OF HARTFORD, CONNECTICUT, ASSIGNOR TO LAPOINTE MACHINE TOOL COMPANY, OF HUDSON, MASSACHUSETTS, A CORPORATION OF MAINE.

BROACHING MACHINE.

Original No. 1,295,957, dated March 4, 1919, Serial No. 203,079, filed November 21, 1917. Application for reissue filed August 14, 1922. Serial No. 581,890.

*To all whom it may concern:*

Be it known that I, HARRY E. BLANCHARD, a citizen of the United States, residing at Hartford, county of Hartford, State of Connecticut, formerly of Hudson, Mass., have invented new and useful Broaching Machines, of which the following is a specification.

This invention relates to a machine for external broaching, and the principal objects thereof are to provide a construction by which the article to be broached is drawn through a plurality of broaches arranged in alignment and adapted to operate one after the other on the article as it is passed through them, and particularly to provide for pulling the article itself through the stationary broaches so as to avoid all possibility of chattering and materially facilitate the operation. Another object of the invention is to provide an efficient arrangement whereby repeated broaching operations can be performed on the same article during its passage through the machine, thus saving a great deal of time and also to provide for performing operations all around the article simultaneously, thus saving time in another way. The invention also involves improvements in details of construction and relative arrangements of parts as will appear.

Reference is to be had to the accompanying drawings, in which—

Figure 1:
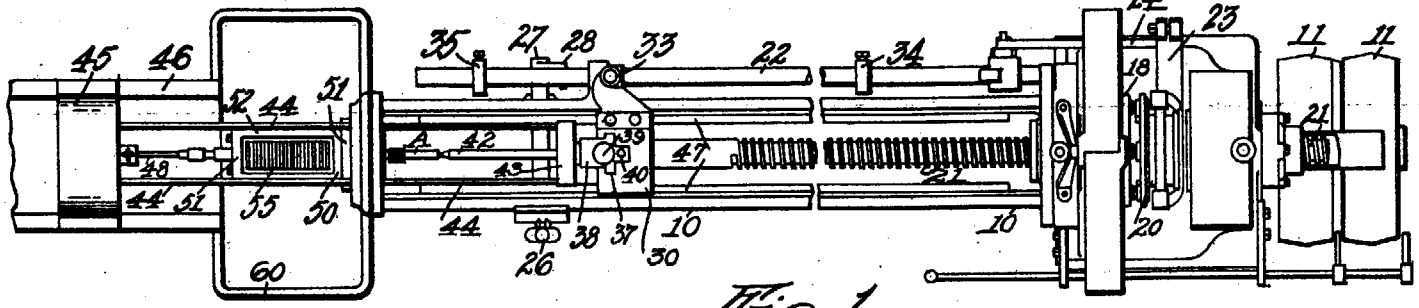
Fig. 1 is a plan of a machine constructed in accordance with this invention.
Figure 2:
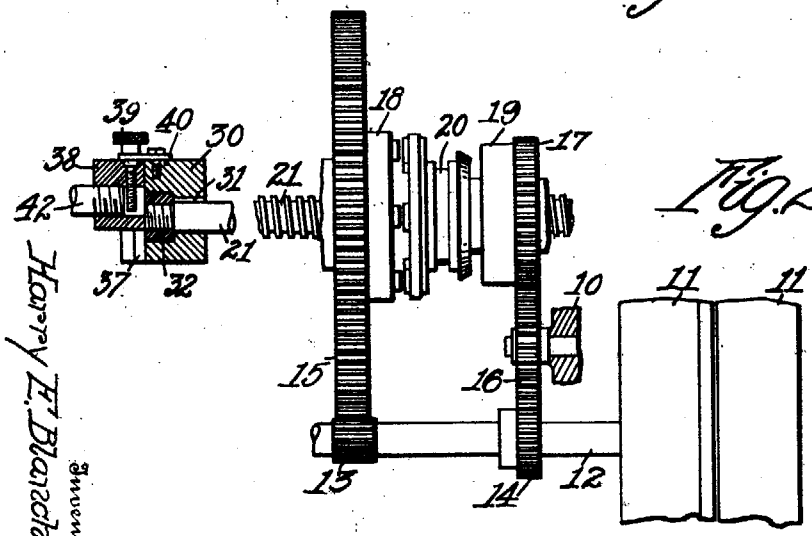
Fig. 2 is a fragmentary side view on enlarged scale showing some parts in section on a central vertical plane.
Figure 3:
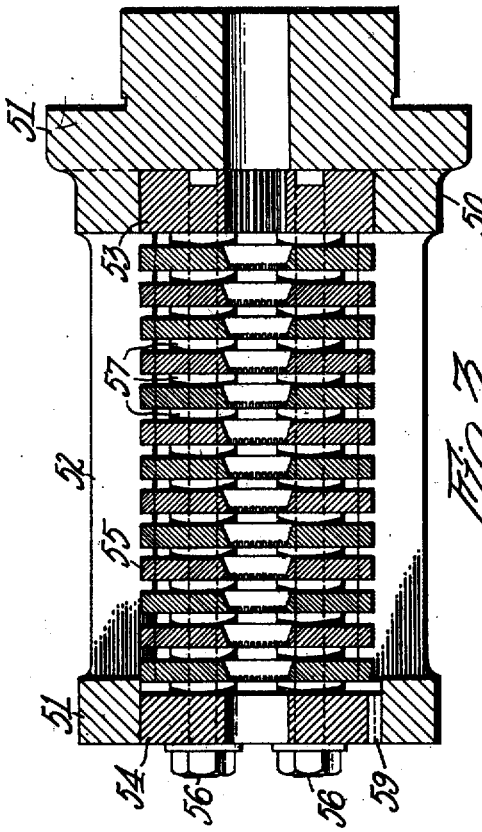
Fig. 3 is a central sectional view of the broach holder and broaches on the line 3—3 of Fig. 4 and on enlarged scale.
Figure 5:
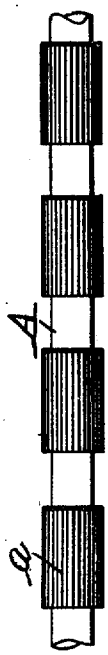
Fig. 5 is a side view of a drawing roll showing the character of work that can be performed on this machine.
Figure 4:
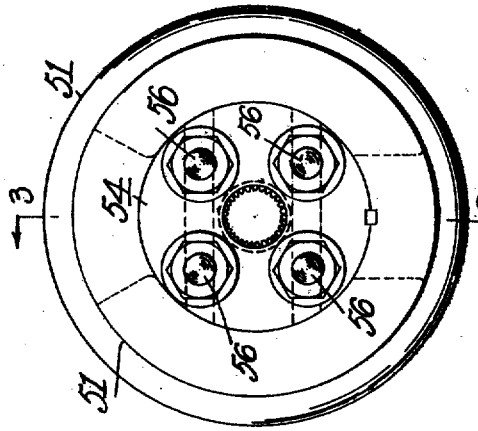
Fig. 4 is an end view of the same.

The machine is shown as mounted on a frame 10 and provided with tight and loose pulleys 11 for operating a driving shaft 12. This shaft has two pinions 13 and 14 adapted to mesh respectively with a gear 15 and a gear 16, which latter meshes with a gear 17. The gear 15 is provided with a clutch hub 18 and the gear 17 with a clutch hub 19. It will be obvious that these two hubs 18 and 19 are rotated in opposite directions and at different speeds. Mounted in alignment with them is a central clutch member 20 which has a nut inside fixed to it for engaging the operating screw 21 and moving it longitudinally. This central clutch member 20 is shown in neutral position in Fig. 2, but it can be moved in either direction along the nut to which it is slidingly keyed so as to move the screw in either direction. This member 20 is operated by a shift rod 22 slidably mounted on the frame and connected by members 23 and 24 with the clutch, the details of which are not shown fully as they do not constitute a part of this invention, and neither does the change gear mechanism.

On one side of the frame is a hand lever 26 adapted by means of a shaft 27 on which it is mounted and an arm 28 to move the shift rod 22 to the right and thus move the clutch member 20 to the left and clutch it to the hub 18 to cause the screw 21 to move to the right with a slow cutting feed. At the end of this screw it is secured to a slide 30 by a key 31 and a nut 32. This slide has a projection 33 moving, of course, with the screw. When the screw has completed its operative motion to the right as far as it is intended to go, the projection 33 engages a dog 34 on the rod 22 and shifts it to the right, which reverses the operation by moving the clutch member 20 to the right so that its conical part clutches into the hub 19 frictionally. The screw is then operated in the reverse direction at a comparatively rapid speed until the projection 33 strikes a dog 35 adjustably mounted on the rod 22, which brings the clutch member out to neutral position and stops the machine.

On the slide 30 are vertical ways 37 located opposite each other in which is mounted a vertically sliding head 38 having an adjusting screw 39 operating in a plate 40 on the top of the slide 30 and adapted to raise or lower the sliding head 38. This sliding head is provided with a center rest 42 screwed into it for supporting one end of the work A which in this case is in the form of a roll for a drawing machine. The vertically sliding head 38 is also provided with a plate 43 which is connected by rods 44 with a slide 45. This latter slide is adapted to move on ways 46 constituting part of the frame of the machine, and the slide 30 and plate 43 slide on ways 47 located in stationary position on the machine. To the slide 45 is fixed a center rest 48 for supporting the opposite end of the work so that both ends of the work are supported solely by the two centers 42 and 48 which move positively together and slide with the screw absolutely.

Mounted on the frame 10 is a stationary holder 50 which constitutes the broach or tool holder. This has two opposite circular heads 51 connected by integral members 52 and is also provided with a removable plate 53 at one end having grooves corresponding with the grooves to be formed on the work, and a removable plate 54 at the other end having a passage for permitting the work to pass through it, and having a registering key 59. The work is performed by a plurality of external broaches 55 all of substantially the same character except that those toward the right are slightly smaller in internal diameter than the next ones to the left. They are formed of hardened steel and are provided with internally projecting teeth for cutting the grooves *a* on the drawing roll A or any other work that is to be performed. They are held in position by bolts 56 secured between the two plates 53 and 54, and of course, located in stationary position while they are spaced apart by collars 57 mounted on the bolts. Being spaced, the chips have a chance to fall down between them. Thus the whole set of broaches is removable and replaceable as one piece.

The operation of moving the screw back and forth has been described and all that need be repeated is that the machine is automatically stopped with the members 43 and 45 at the extreme left so that the center 42 projects through the left end of the series of broaches. The old work is taken out and the the new work placed in position. Then the machine is started by the lever 26, the belt having been shifted on the tight pulley as will be obvious. This results in pulling the work through the broaches, both ends of the work being held firmly, accurately guided, and positively moved forward. In this way there is no material chance for vibration or chattering and the work of numerous tools is performed by a single operation.

A receptacle for oil 60 is shown and means is provided for circulating the oil, but that is not shown and does not constitute part of this invention.

Although I have illustrated and described only a single form of the invention, I am aware of the fact that modifications can be made therein by any person skilled in the art without departing from the scope of the invention as expressed in the claims. Therefore I do not wish to be limited to all the details of construction herein shown and described, but what I do claim is:—

1. In a broaching machine, the combination of a stationary broach holder, a plurality of broaches carried by said holder provided with internal cutting surfaces, and means beyond one end of the broach holder for pulling the work through the holder and broaches toward said means.

2. In a broaching machine, the combination of a stationary broach holder having heads at its ends and spaced integral members connecting them, a plate fitting in said broach holder at one end, means for supporting and spacing apart a plurality of broaches in alignment with said plate, a plate at the other end of the series of broaches, and bolts for securing said broaches and plates in position in the holder.

3. In a broaching machine, the combination of a stationary broach holder having heads at its ends and a skeleton frame connecting them, means for supporting a plurality of broaches in said holder and spacing them apart to provide spaces between the broaches and through the frame for the escape of chips, bolts for securing said broaches together, and means for drawing the work through the broaches.

4. In a broaching machine, the combination of a stationary broach holder having heads at its ends, two plates fitting in said broach holder, one in each of said heads, and means supported by said plates for carrying a plurality of broaches between them and for securing the plates rigidly together, one of said plates being keyed to its head to prevent turning.

5. In a broaching machine, the combination of a stationary broach holder, a pair of plates carried by the ends of said broach holder, and means for rigidly connecting said plates and for supporting a series of broaches between them, one of the heads having means against which the corresponding plate engages so that the work can be drawn through the broaches in the direction toward that head without displacing the plate, said plate also having a passage therethrough having a series of grooves corresponding with the cutting surfaces of the broaches.

6. In a broaching machine, the combination of a stationary broach holder having means for holding a plurality of external broaches, two slides on opposite sides of said broach holder each having a center point for holding the work, said slides being connected together, and means for moving said slides in a direction to draw the work axially through the broaches, one of said center points being long enough to extend all the way through the series of broaches to permit the removal of the work and setting it in position.

7. In a broaching machine, the combination of a stationary broach holder having means for supporting and spacing apart a plurality of broaches in alignment, means for supporting the work and drawing it through the broaches comprising a non-rotatable screw, a nut engaging the screw, means for turning said nut in either direction to move the screw back and forth, means for automatically reversing the nut after the working stroke has been completed, and means for then stopping it to bring the work back to its initial position beyond the broaches and permit it to be removed.

8. In a broaching machine, the combination of stationary broach holder having means for supporting and spacing apart a plurality of broaches in alignment, means for drawing the work through the broaches comprising a slide, transverse ways across said slide, a head transversely adjustable on said ways, a center support carried by said head, a screw non-rotatably fixed to said slide, a nut engaging the screw, and means for turning said nut in either direction to move the screw back and forth.

9. In a broaching machine, the combination of a broach holder having means for supporting a broach, means for supporting the work and drawing it through the broach, means for automatically reversing the work after the working stroke has been completed, and means for then stopping it to bring the work back to its initial position beyond the broach and permit it to be removed.

10. In a broaching machine, the combination with a broach holder having a recess therein, of two plates fitting in the ends of said recess, and means for fixing a series of broaches to said plates independently of the holder, whereby they are movable and replaceable as a whole.

11. In a broaching machine, the combination of means for supporting the work and a broach, and means for causing a relative reciprocating motion thereof comprising a non-rotatable screw, a nut engaging the screw, means for turning said nut in either direction to move the screw back and forth, means for automatically reversing the work after the working stroke has been completed, and means for then stopping it to bring the parts back to initial position.

12. The combination of a stationary broach holder having heads at its ends and spaced integral members connecting them, a plate fitting in said broach holder at one end, a plurality of broaches located in alignment with said plate, means for supporting said broaches and spacing them apart, a plate at the other end of the series of broaches, and bolts for securing said broaches and plates in position in the holder.

13. The combination of a stationary broach holder having heads at its ends and a skeleton frame connecting them, a plurality of broaches in said holder having holes therethrough, means for supporting said broaches and spacing them apart to provide spaces between the broaches and through the frame for the escape of chips, bolts extending through said holes for securing said broaches together, and means for drawing the work through the broaches.

14. The combination of a stationary broach holder having heads at its ends, two plates fitting in said broach holder, one in each of said heads, a plurality of broaches between said heads, and means supported by said plates for carrying the broaches between them and for securing the plates rigidly together, one of said plates being keyed to its head to prevent turning.

15. The combination of a stationary broach holder, a pair of plates carried by the ends of said broach holder, a series of broaches between them having a circular series of internal grooves forming cutting surfaces, and means for rigidly connecting said plates and for supporting said broaches, one of the heads having means against which the corresponding plate engages so that the work can be drawn through the broaches in the direction toward that head without displacing the plate, said plate also having a passage therethrough having a series of grooves corresponding with the cutting surfaces of the broaches.

16. The combination with a broach holder having a recess therein, of two plates fitting in the ends of said recess, a series of broaches, and means for fixing said broaches to said plates independently of the holder, whereby they are movable and replaceable as a whole.

17. The combination with a broach holder having a recess therein, of two plates fitting in the ends of said recess, a series of broaches, and means for fixing said broaches to said plates independently of the holder, whereby they are movable and replaceable as a whole, said means comprising bolts passing through the plates and broaches from end to end of the series, said broaches being perforated at points beyond their cutting surfaces to receive the bolts.

18. A set of broaches each having a central internally grooved opening providing a circular series of longitudinal cutting edges, the openings gradually varying in size from one end of the series to the other, the broaches also having registering perforations beyond said openings, spacing collars between each two adjacent broaches, and a set of bolts passing through said perforations for holding the broaches and collars as a unit.

19. As an article of manufacture, an external broaching die comprising a plate of hardened steel having a central perforation provided with a circle of grooves in its edge forming teeth having cutting edges, said plate having perforations therethrough outside said perforation for receiving fastening bolts.

In testimony whereof, I have hereunto affixed my signature.

HARRY E. BLANCHARD.